United States Patent
Nishikawa

(10) Patent No.: US 11,221,027 B2
(45) Date of Patent: Jan. 11, 2022

(54) HYDRAULIC DEVICE

(71) Applicant: Shimano Inc., Osaka (JP)

(72) Inventor: Yusuke Nishikawa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/877,849

(22) Filed: May 19, 2020

(65) Prior Publication Data

US 2021/0364016 A1    Nov. 25, 2021

(51) Int. Cl.
*B62L 3/02* (2006.01)
*F15B 15/04* (2006.01)
*F15B 1/26* (2006.01)

(52) U.S. Cl.
CPC ............. *F15B 15/04* (2013.01); *B62L 3/023* (2013.01); *F15B 1/26* (2013.01)

(58) Field of Classification Search
CPC ............. B60T 7/00; B60T 7/08; B62L 23/023
See application file for complete search history.

(56) References Cited

U.S. PATENT DOCUMENTS

| | | | |
|---|---|---|---|
| 9,874,238 B2 | 1/2018 | Kariyama et al. | |
| 2015/0336629 A1* | 11/2015 | Ruopp | B60T 11/236 60/562 |
| 2018/0304960 A1* | 10/2018 | Komada | B62L 3/023 |
| 2019/0061869 A1* | 2/2019 | Komada | B62L 3/023 |

* cited by examiner

*Primary Examiner* — Michael Leslie
*Assistant Examiner* — Daniel S Collins
(74) *Attorney, Agent, or Firm* — Global IP Counselors, LLP

(57) ABSTRACT

A hydraulic device is basically provided with a cylinder housing and a reservoir. The cylinder housing includes a cylinder bore. The reservoir is configured to be in fluid communication with the cylinder bore. The reservoir includes a reservoir tank and a lid slidably attached to the reservoir tank.

20 Claims, 8 Drawing Sheets

HYDRAULIC DEVICE

BACKGROUND

Technical Field

This disclosure generally relates to a hydraulic device. More specifically, the present disclosure relates to a hydraulic device for a human powered vehicle.

Background Information

Human-powered vehicles (e.g., bicycles) are sometimes provided with hydraulic devices. Examples of some hydraulic devices include a hydraulic operating device and a hydraulic operated device. A hydraulic operating device is operated by a user to hydraulically operate the hydraulic operated device. For example, in a hydraulic braking system, a hydraulic brake operating device is fluidly connected to a hydraulic brake device such that a user operates a brake lever of a hydraulic brake operating device to actuate a hydraulic brake device to engage a brake rotor or a rim of a wheel. The hydraulic operating device typically includes a piston that is slidably disposed in a cylinder bore of a cylinder housing, and a brake lever actuating the master piston. The cylinder housing contains a hydraulic fluid. The cylinder bore of the cylinder housing is in fluid communication with a hydraulic operated device (e.g., a disc brake caliper housing in the case of a hydraulic disc brake) via a fluid conduit. Brake pads of the hydraulic operated device are typically spaced apart from a rotor by a predetermined gap. The movement of fluid into the caliper housing causes the pistons in the caliper housing to move, and eventually brings the brake pads into contact with a rotor. One example of hydraulic braking system is disclosed in U.S. Pat. No. 9,874,238 B2.

SUMMARY

Generally, the present disclosure is directed to various features of a hydraulic device for a human-powered vehicle.

The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a hydraulic device is provided that basically comprises a cylinder housing and a reservoir. The cylinder housing includes a cylinder bore. The reservoir is configured to be in fluid communication with the cylinder bore. The reservoir includes a reservoir tank and a lid slidably attached to the reservoir tank.

With the hydraulic device according to the first aspect, it is possible to easily attach the lid to the reservoir tank.

In accordance with a second aspect of the present disclosure, the hydraulic device according to the first aspect is configured so that the reservoir tank and the lid define a guiding structure to slidably guide the lid with respect to the reservoir tank.

With the hydraulic device according to the second aspect, it is possible to easily slide the lid onto the reservoir tank.

In accordance with a third aspect of the present disclosure, the hydraulic device according to the second aspect is configured so that the guiding structure includes a guiding protrusion and a guiding recess. The guiding protrusion is provided to one of the reservoir tank and the lid. The guiding recess is provided to the other of the reservoir tank and the lid to engage with the guiding protrusion.

With the hydraulic device according to the third aspect, it is possible to easily slide the lid onto the reservoir tank using a simple structure.

In accordance with a fourth aspect of the present disclosure, the hydraulic device according to the third aspect is configured so that the guiding protrusion is provided to the lid. The guiding protrusion includes a first guiding protrusion, and a second guiding protrusion facing toward the first guiding protrusion. The guiding recess is provided to the reservoir tank. The guiding recess includes a first guiding recess configured to engage the first guiding protrusion, and a second guiding recess configured to engage the second guiding protrusion.

With the hydraulic device according to the fourth aspect, it is possible to ensure the lid is firmly retained on the reservoir tank while still allowing easy installation.

In accordance with a fifth aspect of the present disclosure, the hydraulic device according to any one of the first to fourth aspects is configured so that the cylinder bore defines a cylinder axis extending in an axial direction of the cylinder bore, and the lid is slidable in a sliding direction non-perpendicular to the axial direction.

With the hydraulic device according to the fifth aspect, it is possible to install the lid without interfering with other parts of the hydraulic device.

In accordance with a sixth aspect of the present disclosure, the hydraulic device according to any one of the first to fifth aspects further comprises a positioning member configured to position the lid to the reservoir tank.

With the hydraulic device according to the sixth aspect, it is possible to correctly position the lid with respect to the reservoir tank in the final installation position.

In accordance with a seventh aspect of the present disclosure, the hydraulic device according to the sixth aspect is configured so that the positioning member includes a pin press-fitted to at least one of the lid and the reservoir tank.

With the hydraulic device according to the seventh aspect, it is possible to easily retain the lid with respect to the reservoir tank in the final installation position.

In accordance with an eighth aspect of the present disclosure, the hydraulic device according to any one of the first to seventh aspects is configured so that the pin is press-fitted to both the lid and the reservoir tank.

With the hydraulic device according to the eighth aspect, it is possible securely retain the lid to the reservoir tank in the final installation position.

In accordance with a ninth aspect of the present disclosure, the hydraulic device according to any one of the first to eighth aspects is configured so that the reservoir is provided to the cylinder housing.

With the hydraulic device according to the ninth aspect, it is possible to provide a compact arrangement.

In accordance with a tenth aspect of the present disclosure, the hydraulic device according to the ninth aspect is configured so that the cylinder housing has a bleeding part configured to be in fluid communication with the cylinder bore, and the reservoir has same height as the bleeding part with respect to the cylinder housing in a direction perpendicular to an axial direction of the cylinder bore.

With the hydraulic device according to the tenth aspect, it is possible to easy carry out a bleeding process without the bleeding part protruding from the cylinder housing.

In accordance with an eleventh aspect of the present disclosure, the hydraulic device according to any one of the first to tenth aspects is configured so that the reservoir includes a diaphragm arranged to define a reservoir chamber between the reservoir tank and the diaphragm.

With the hydraulic device according to the eleventh aspect, it is possible to it is possible to absorb a volume change of a fluid in a hydraulic root.

In accordance with a twelfth aspect of the present disclosure, the hydraulic device according to the eleventh aspect is configured so that the lid has an opening configured to at least partly expose the diaphragm to atmosphere.

With the hydraulic device according to the twelfth aspect, it is possible to ensure that the diaphragm works effectively.

In accordance with a thirteenth aspect of the present disclosure, the hydraulic device according to the twelfth aspect is configured so that the cylinder bore defines a cylinder axis extending in an axial direction of the cylinder bore, and the opening faces in the axial direction of the cylinder bore.

With the hydraulic device according to the thirteenth aspect, it is possible to release any air trapped between the lid and the diaphragm during installation of the lid.

In accordance with a fourteenth aspect of the present disclosure, the hydraulic device according any one of the eleventh to thirteenth aspects is configured so that the reservoir includes an intermediate member arranged between the lid and the diaphragm.

With the hydraulic device according to the fourteenth aspect, it is possible to easily maintain a position of the diaphragm during installation of the lid.

In accordance with a fifteenth aspect of the present disclosure, the hydraulic device according to the fourteenth aspect is configured so that the diaphragm and the intermediate member define a positioning structure to position the diaphragm and the intermediate member relative to one another.

With the hydraulic device according to the fifteenth aspect, it is possible to properly maintain the position of the diaphragm during installation of the lid.

In accordance with a sixteenth aspect of the present disclosure, the hydraulic device according to the fifteenth aspect is configured so that the positioning structure includes a positioning protrusion and a positioning recess. The positioning protrusion is provided to one of the diaphragm and the intermediate. The positioning recess is provided to the other of the diaphragm and the intermediate member to engage with the positioning protrusion.

With the hydraulic device according to the sixteenth aspect, it is possible to more easily maintain the position of the diaphragm during installation of the lid.

In accordance with a seventeenth aspect of the present disclosure, the hydraulic device according to the sixteenth aspect is configured so that the positioning protrusion is circumferentially provided along an outer edge of the one of the diaphragm and the intermediate member, and the positioning recess is circumferentially provided along an outer edge of the other of diaphragm and the intermediate member.

With the hydraulic device according to the seventeenth aspect, it is possible to firmly maintain the position of the diaphragm during installation of the lid.

In accordance with an eighteenth aspect of the present disclosure, the hydraulic device according to any one of the fourteenth to seventeenth aspects is configured so that the intermediate member is made of a resin material.

With the hydraulic device according to the eighteenth aspect, it is possible to inexpensively manufacture the intermediate member while also minimizing the weight of the intermediate member.

In accordance with a nineteenth aspect of the present disclosure, the hydraulic device according to any one of the first to eighteenth aspects further comprises a piston arranged in the cylinder bore to define a cylinder chamber between the cylinder bore and the piston.

With the hydraulic device according to the nineteenth aspect, it is possible to use the hydraulic device to operate a hydraulically operated device such as a disc brake caliper.

In accordance with a twentieth aspect of the present disclosure, the hydraulic device according to the nineteenth aspect further comprises an operating member operatively coupled to the piston.

With the hydraulic device according to the twentieth aspect, a rider can easily operate the hydraulic device.

Also, other objects, features, aspects and advantages of the disclosed hydraulic device will become apparent to those skilled in the art from the following detailed description, which, taken in conjunction with the annexed drawings, discloses preferred embodiments of the hydraulic device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle (e.g., the bicycle field) from this disclosure that the following descriptions of the embodiments are provided for illustration only and not for the purpose of limiting the invention as defined by the appended claims and their equivalents.

Figure 1:
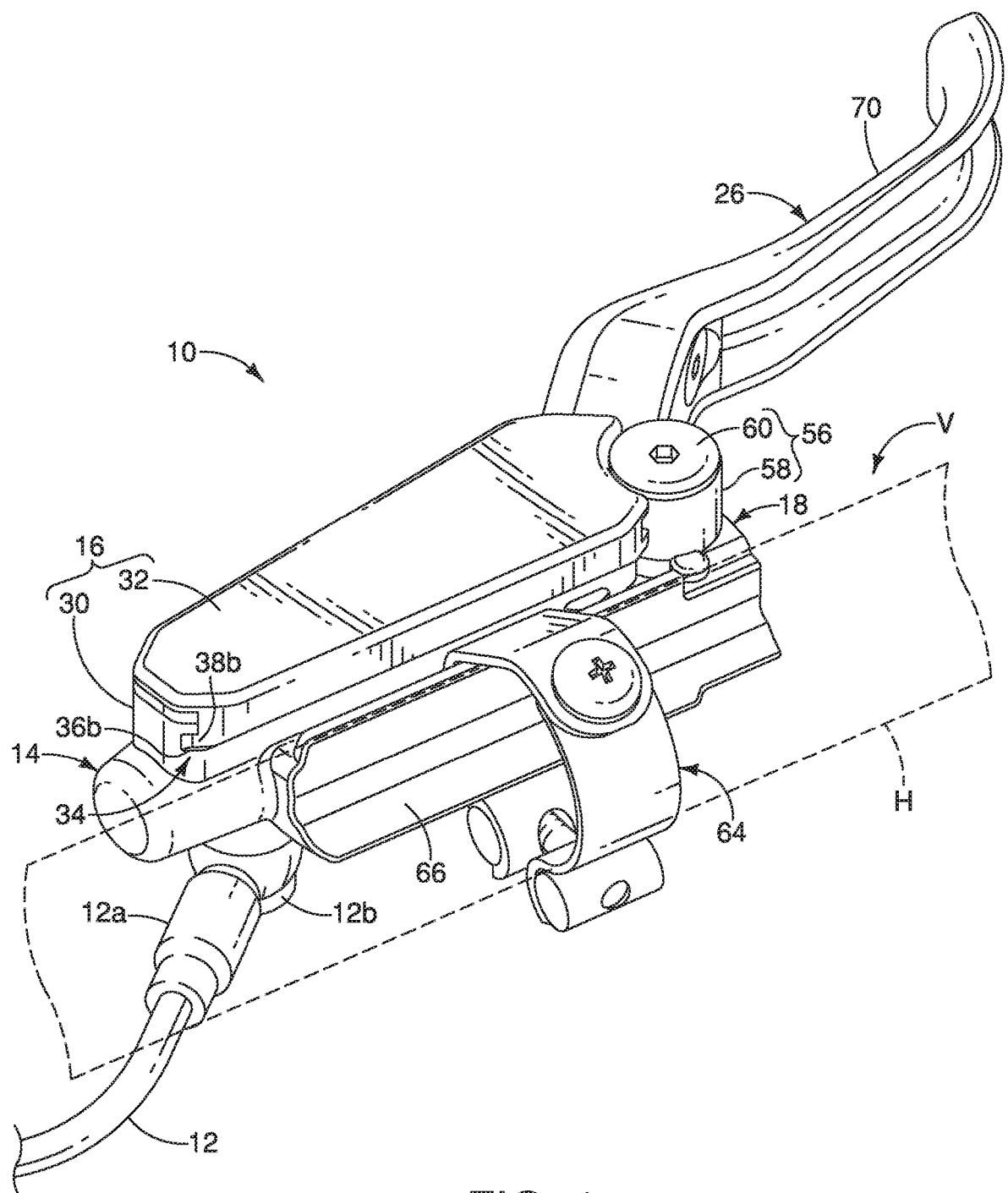
FIG. 1 is a top perspective view of a portion of a handlebar of a human-powered vehicle that is equipped with a hydraulic device in accordance with a first embodiment.
Figure 2:
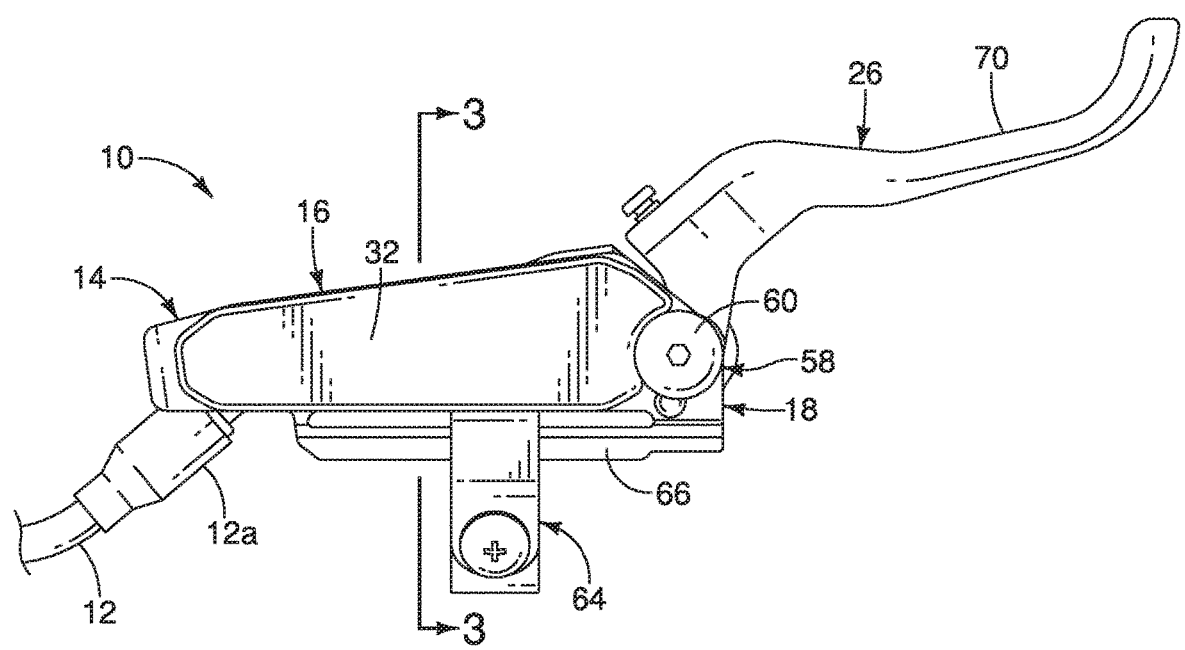
FIG. 2 is a top plan view of the hydraulic device illustrated in FIG. 1.

Referring initially to FIG. 1, a hydraulic device 10 is provided for a human-powered vehicle V (only a handlebar H is shown) in accordance with a first illustrative embodiment. Here, in the illustrated embodiments, the hydraulic device 10 is a hydraulic operating device that is provided for the human-powered vehicle V (e.g., a bicycle). The hydraulic device 10 is mounted to the handlebar H of the human-powered vehicle V. Here, the human-powered vehicle V is preferably a bicycle.

The hydraulic device 10 is fluidly connected to another hydraulic device (not shown) by a hydraulic hose 12. As illustrated in FIG. 1, the hydraulic device 10 is a right-hand side hydraulic brake actuating device that is operated by the rider's right hand from a rest or non-operated position (FIGS. 1 to 8) to an operated position (FIG. 9) for actuating a hydraulic operated device such as a disc brake caliper or a rim brake caliper. It will be apparent to those skilled in the human-powered vehicle field that the configuration of the hydraulic device 10 can be adapted to a left-hand side hydraulic brake actuating device that is operated by the rider's left hand. Also, the hydraulic device 10 can be used with other vehicle components other than a brake caliper.

Figure 3:
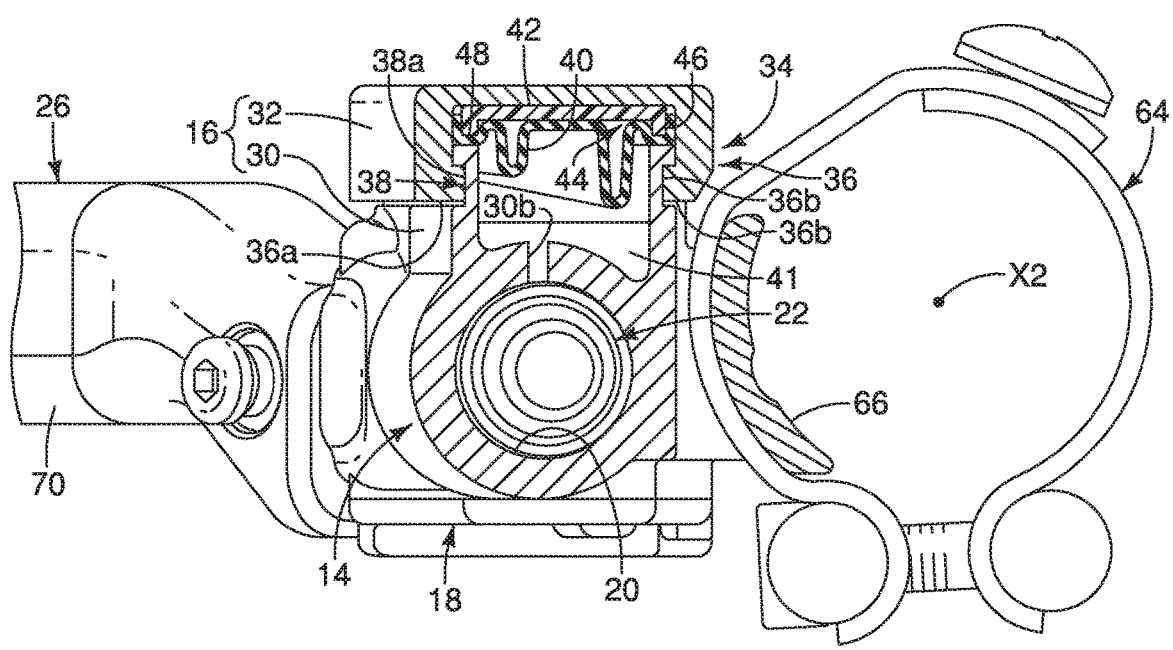
FIG. 3 is a cross-sectional view of the hydraulic device illustrated in FIGS. 1 and 2 as seen along section line 3-3 of FIG. 2.
Figure 5:
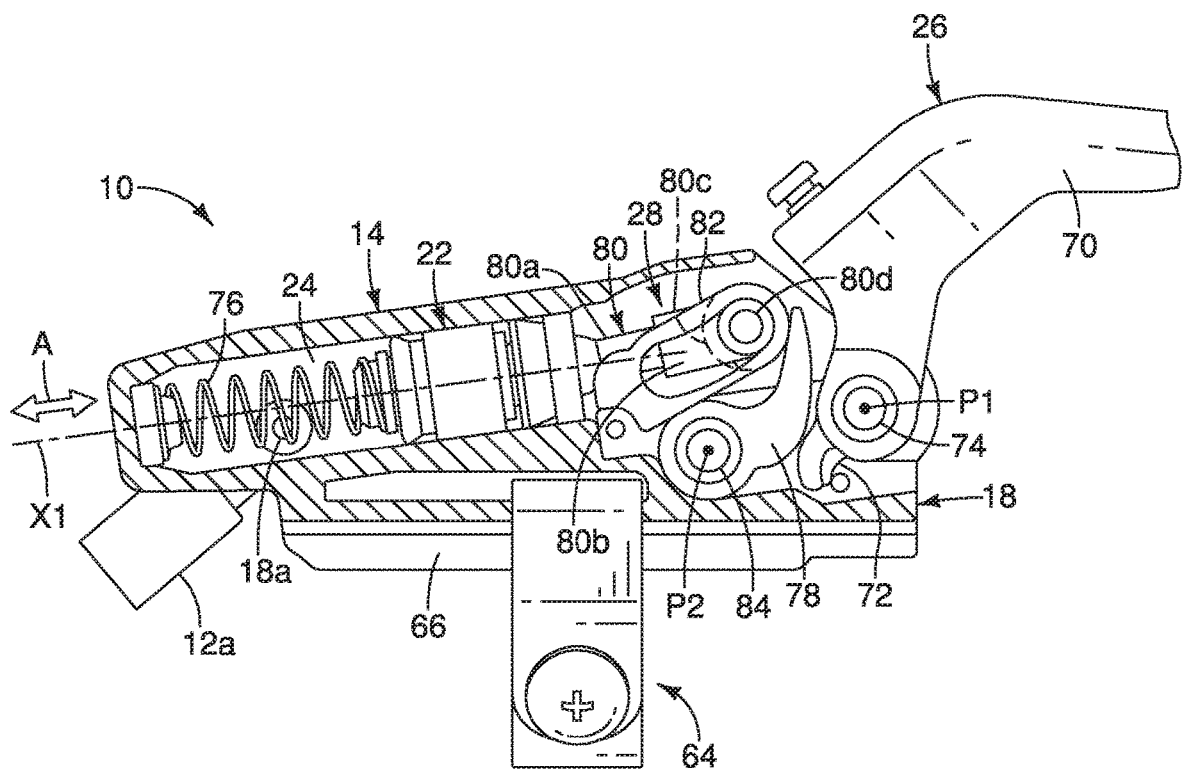
FIG. 5 is a partial cross-sectional view of the hydraulic device illustrated in FIGS. 1 to 4 with the piston shown in a full view and in which the cross section is taken along section plane that is perpendicular to and passes through a cylinder axis of a cylinder bore of the base of the hydraulic device.
Figure 6:
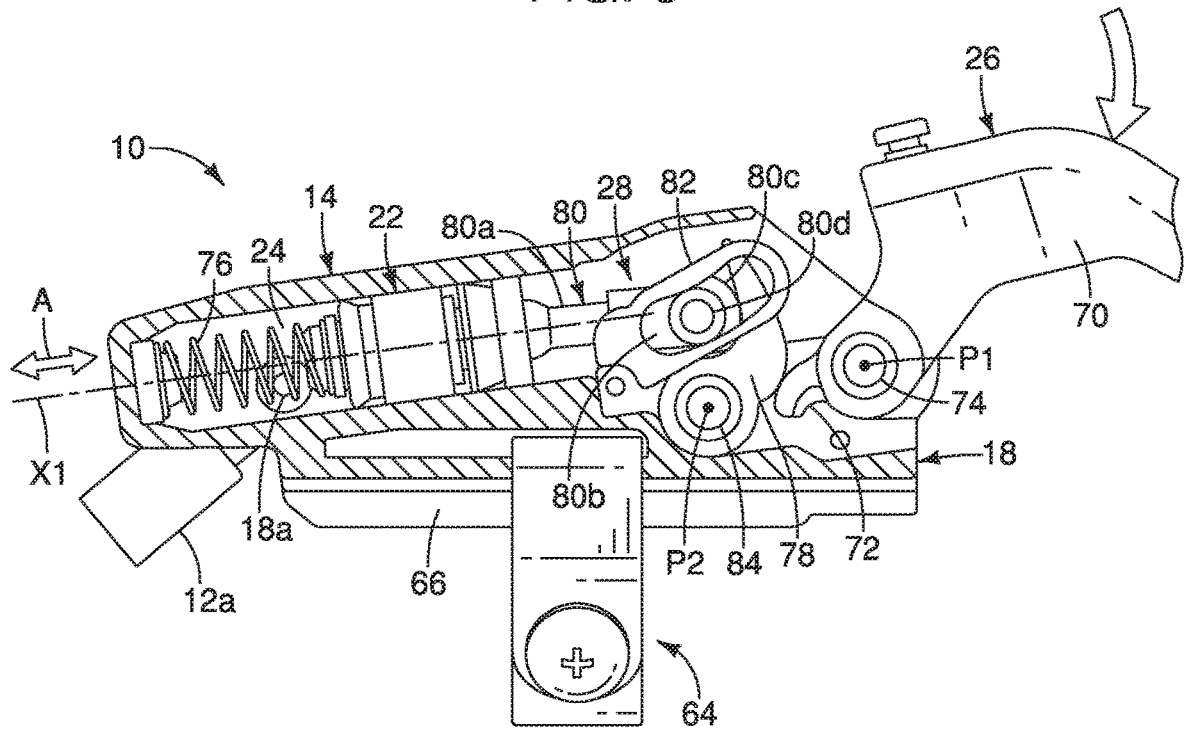
FIG. 6 is a partial cross-sectional view, similar to FIG. 8, of the hydraulic device illustrated in FIGS. 1 to 5, but in which the operating member has been moved to an actuated position.

As seen in FIGS. 1 to 4, the hydraulic device 10 basically comprises a cylinder housing 14 and a reservoir 16. The reservoir 16 is filled with a fluid such as mineral oil or other suitable fluid. The reservoir 16 is provided to the cylinder housing 14. Here, the cylinder housing 14 and the reservoir 16 are integrated to at least partially form a base 18. As seen in FIGS. 3, 5 and 6, the cylinder housing 14 includes a cylinder bore 20. The cylinder bore 20 is preferably formed in a cylindrical shape. The cylinder bore 20 defines a cylinder axis X1 extending in an axial direction A of the cylinder bore 20 (see FIGS. 5 and 6). The base 18 has a fluid port 18a that is in fluid communication with the cylinder bore 20. The hydraulic hose 12 is fluidly connected to the fluid port 18a by a hose connector 12a of the hydraulic hose 12 using a banjo bolt 12b (see FIG. 1). As seen in FIG. 3, the reservoir 16 is configured to be in fluid communication with the cylinder bore 20. In this way, the fluid in the reservoir 16 is in fluid communication with the cylinder bore 20 which in turn is in fluid communication with the hydraulic hose 12 via the fluid port 18a.

The hydraulic device 10 further comprises a piston 22 that is arranged in the cylinder bore 20 to define a cylinder chamber 24 between the cylinder bore 20 and the piston 22. In particular, the piston 22 is movably provided in the cylinder bore 20 to move in the axial direction A of the cylinder bore 20. In response to a movement of the piston 22 in the axial direction A towards the fluid port 18a, some of the fluid in the cylinder chamber 24 is forced out of the cylinder chamber 24 into the hydraulic hose 12 via the fluid port 18a. Here, the piston 22 is inserted into the cylinder bore 20 from an open end 20a of the cylinder bore 20.

In the illustrated embodiment, the hydraulic device 10 further comprises an operating member 26. The operating member 26 operatively coupled to the piston 22. In particular, the hydraulic device 10 further comprises a torque transmission mechanism 28 that operatively connects the operating member 26 to the piston 22 as explained later.

Figure 4:
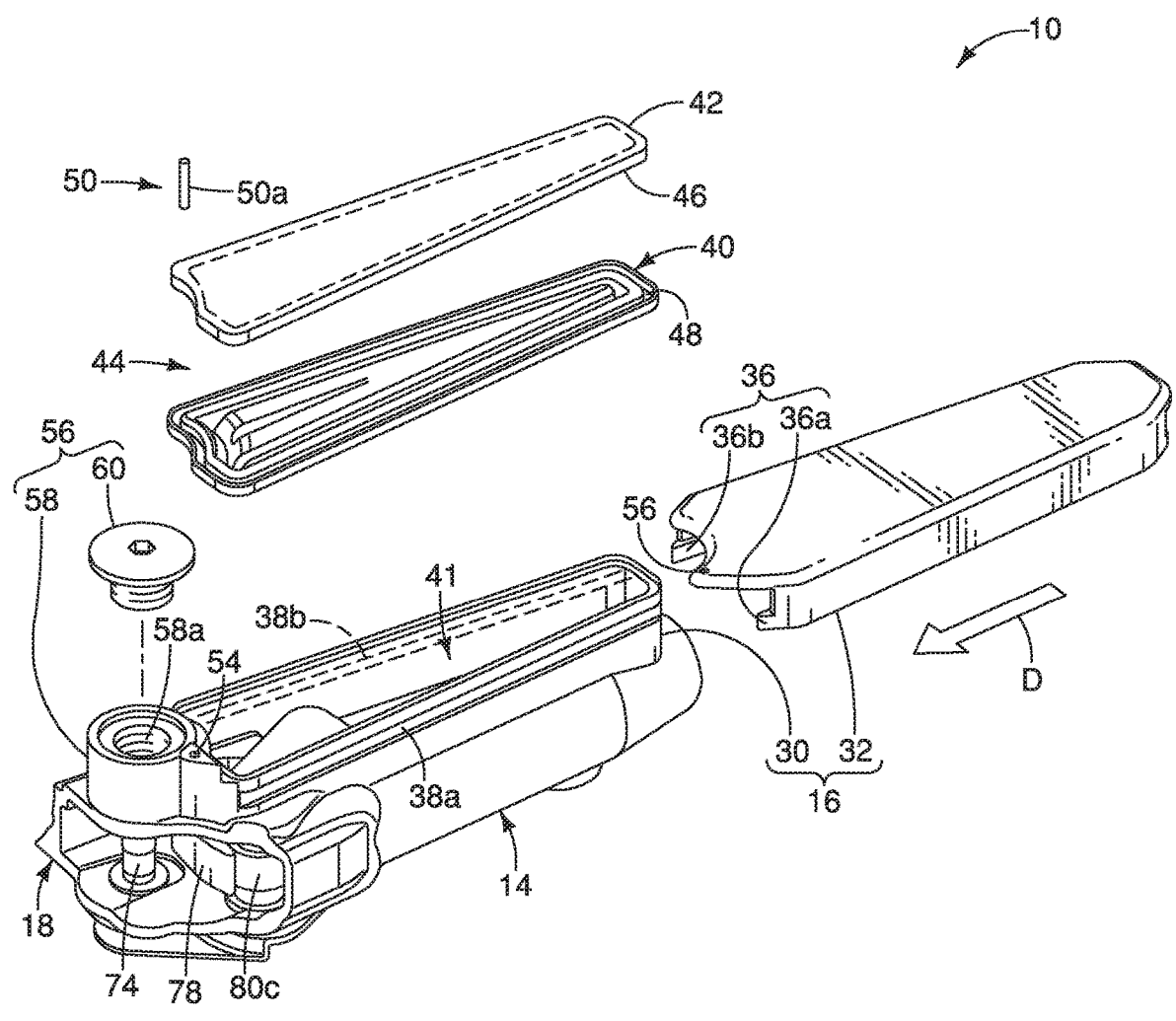
FIG. 4 is an exploded perspective view of selected part of the hydraulic device illustrated in FIGS. 1 to 3.

In the illustrated embodiment, as seen in FIGS. 1, 3 and 4, the reservoir 16 includes a reservoir tank 30 and a lid 32 that is slidably attached to the reservoir tank 30. The lid 32 is slidable in a sliding direction D that is non-perpendicular to the axial direction A. In the illustrated embodiment, the sliding direction D is parallel to the axial direction A. Thus, the lid 32 is slidable in the axial direction A. Here, the reservoir tank 30 is integrally formed with the cylinder housing 14 as a one-piece member. For example, the reservoir tank 30 and the cylinder housing 14 can be a single member made of a metallic material or a resin material. The lid 32 is a rigid member that can be made of a metallic material or a resin material.

The reservoir tank 30 and the lid 32 define a guiding structure 34 to slidably guide the lid 32 with respect to the reservoir tank 30. Here, the guiding structure 34 includes a guiding protrusion 36 and a guiding recess 38. The guiding protrusion 36 is provided to one of the reservoir tank 30 and the lid 32, while the guiding recess 38 is provided to the other of the reservoir tank 30 and the lid 32 to engage with the guiding protrusion 36. In the illustrated embodiment, the guiding protrusion 36 is provided to the lid 32, while the guiding recess 38 is provided to the reservoir tank 30. Preferably, as in the illustrated embodiment, the guiding protrusion 36 includes a first guiding protrusion 36a and a second guiding protrusion 36b, while the guiding recess 38 includes a first guiding recess 38a and a second guiding recess 38b. The second guiding protrusion 36b faces toward the first guiding protrusion 36b. The first guiding recess 38a is configured to engage the first guiding protrusion 36a. The second guiding recess 38b is configured to engage the second guiding protrusion 36b. Here, the first guiding protrusion 36a and the second guiding protrusion 36b are elongated rails that converge as they extend along the sliding direction D in which the lid 32 is attached to the reservoir tank 30. Thus, the first guiding recess 38a and the second guiding recess 38b are elongated recesses that mate with the first guiding protrusion 36a and the second guiding protrusion 36b to retain the lid 32 to the reservoir tank 30 at least in a direction perpendicular to the sliding direction D. The first guiding protrusion 36a and the second guiding protrusion 36b can be press fitted to the first guiding recess 38a and the second guiding recess 38b, respectively. In this way, the lid 32 is also retained to the reservoir tank 30 in the sliding direction D.

Figure 12:
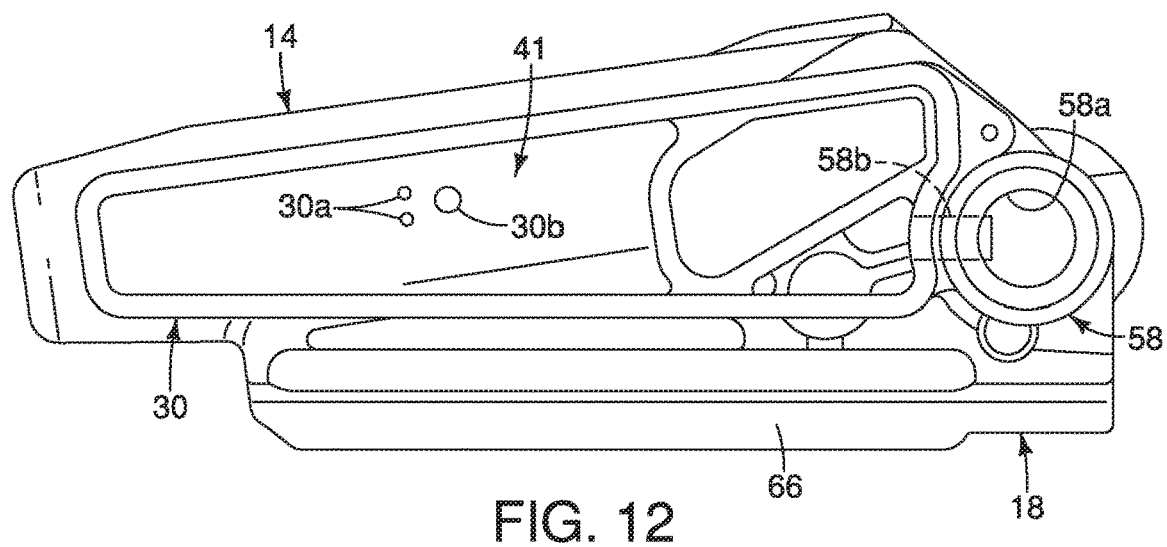
FIG. 12 is a top plan view of a base of the hydraulic device illustrated in FIGS. 1 to 9 showing the reservoir tank.
Figure 13:
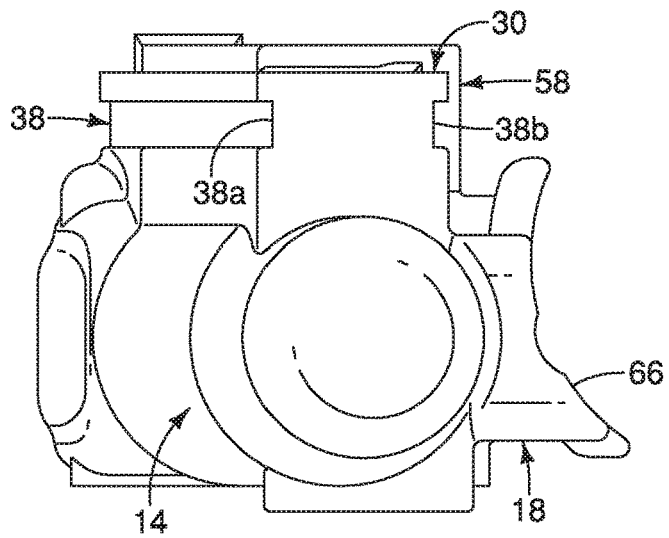
FIG. 13 is an inner end elevational view of the base illustrated in FIG. 12.
Figure 14:
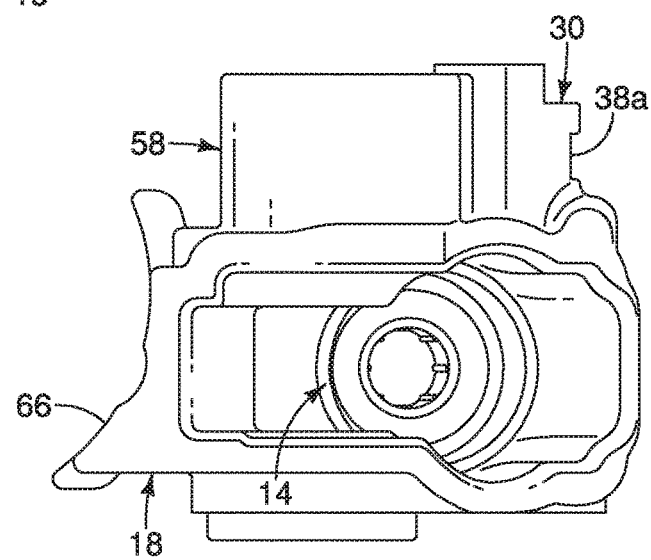
FIG. 14 is an outer end elevational view of the base illustrated in FIGS. 12 and 13.

As seen in FIGS. 3 and 4, the reservoir 16 further includes a diaphragm 40 that is arranged to define a reservoir chamber 41 between the reservoir tank 30 and the diaphragm 40. The reservoir chamber 41 is fluidly connected to the cylinder bore 20 by openings 30a and 30b as seen in FIGS. 3 and 12.

The openings 30a provide hydraulic fluid from the reservoir 16 to the cylinder chamber 24 in a state where the piston 22 is in the rest position as seen in FIG. 5. The openings 30a is closed from the cylinder chamber 24 by the piston 22 as the piston 22 moves from the rest position (FIG. 5) to the actuated position (FIG. 6). The opening 30b provide hydraulic fluid from the reservoir 16 to the piston 22 for lubricating the piston 22 as the piston 22 moves between the rest position (FIG. 5) and the actuated position (FIG. 6).

The diaphragm 40 is a flexible, resilient member made of a suitable material such as a rubber material (an elastomeric material). The diaphragm 40 is a one-piece member. Here, in the illustrated embodiment, the reservoir 16 further includes an intermediate member 42 arranged between the lid 32 and the diaphragm 40. The intermediate member 42 is made of a resin material. The intermediate member 42 is a one-piece member. The diaphragm 40 and the intermediate member 42 define a positioning structure 44 to position the diaphragm 40 and the intermediate member 42 relative to one another.

As seen in FIGS. 3 and 4, the positioning structure 44 includes a positioning protrusion 46 and a positioning recess 48. The positioning protrusion 46 is provided to one of the diaphragm 40 and the intermediate member 42, while the positioning recess 48 is provided to the other of the diaphragm 40 and the intermediate member 42 to engage with the positioning protrusion 46. Preferably, as in the illustrated embodiment, the positioning protrusion 46 is circumferentially provided along an outer edge of the one of the diaphragm 40 and the intermediate member 42, while the positioning recess 48 is circumferentially provided along an outer edge of the other of diaphragm 40 and the intermediate member 42. Here, the positioning protrusion 46 is an annular protrusion provided an outer edge of the intermediate member 42, while the positioning recess 48 is an annular recess provided an outer edge of the diaphragm 40. In this way, the diaphragm 40 is sandwiched in between the intermediate member 42 and the reservoir tank 30 to prevent movement of the diaphragm 40. In particular, the outer peripheral edge of the diaphragm 40 has the positioning recess 48 which receives the positioning protrusion 46 of the intermediate member 42. Thus, the diaphragm 40 is sandwiched in between the outer peripheral edge of the reservoir tank 30 and the positioning protrusion 46 of the intermediate member 42.

Figure 7:
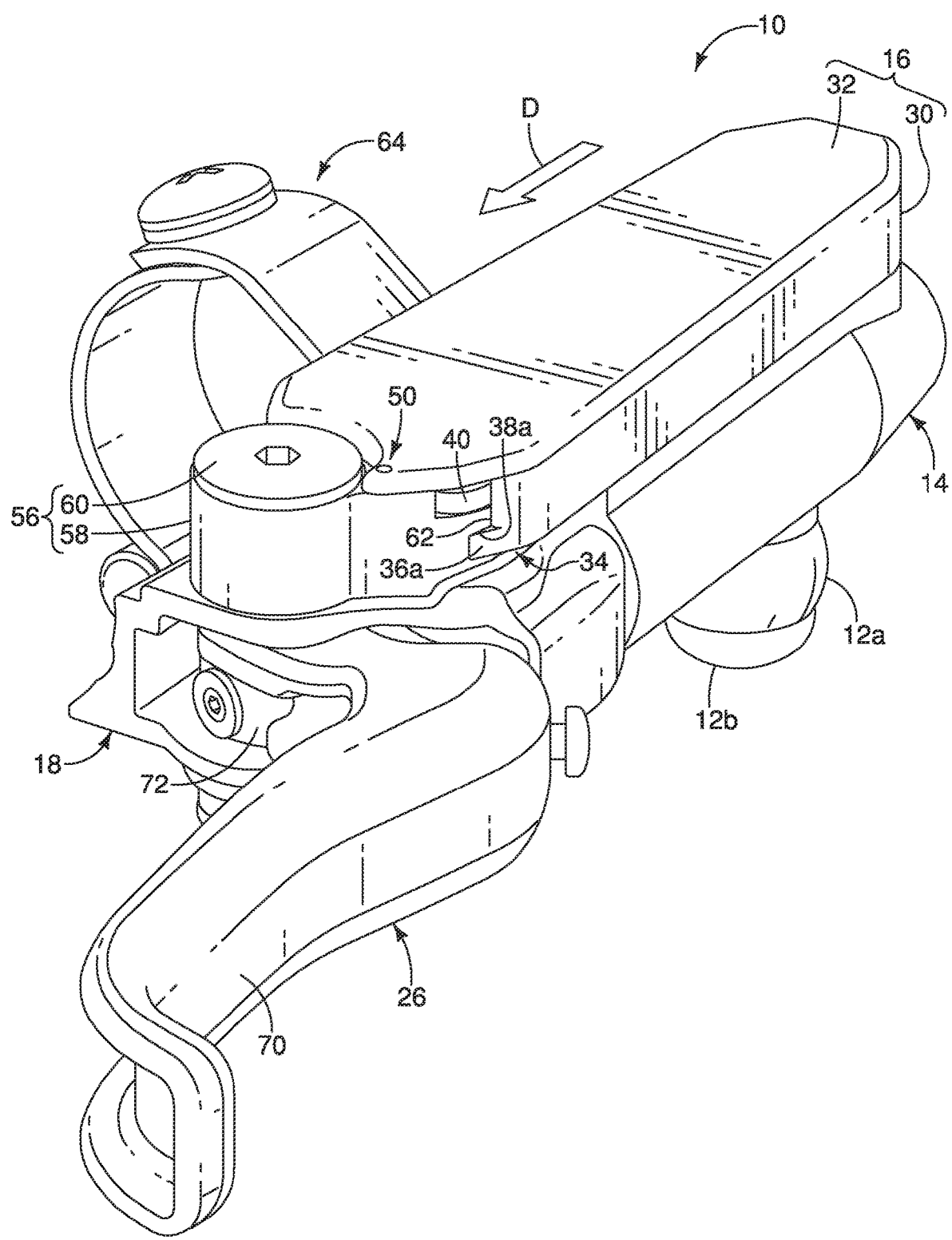
FIG. 7 is an enlarged top perspective view of the hydraulic device illustrated in FIGS. 1 to 6.
Figure 9:
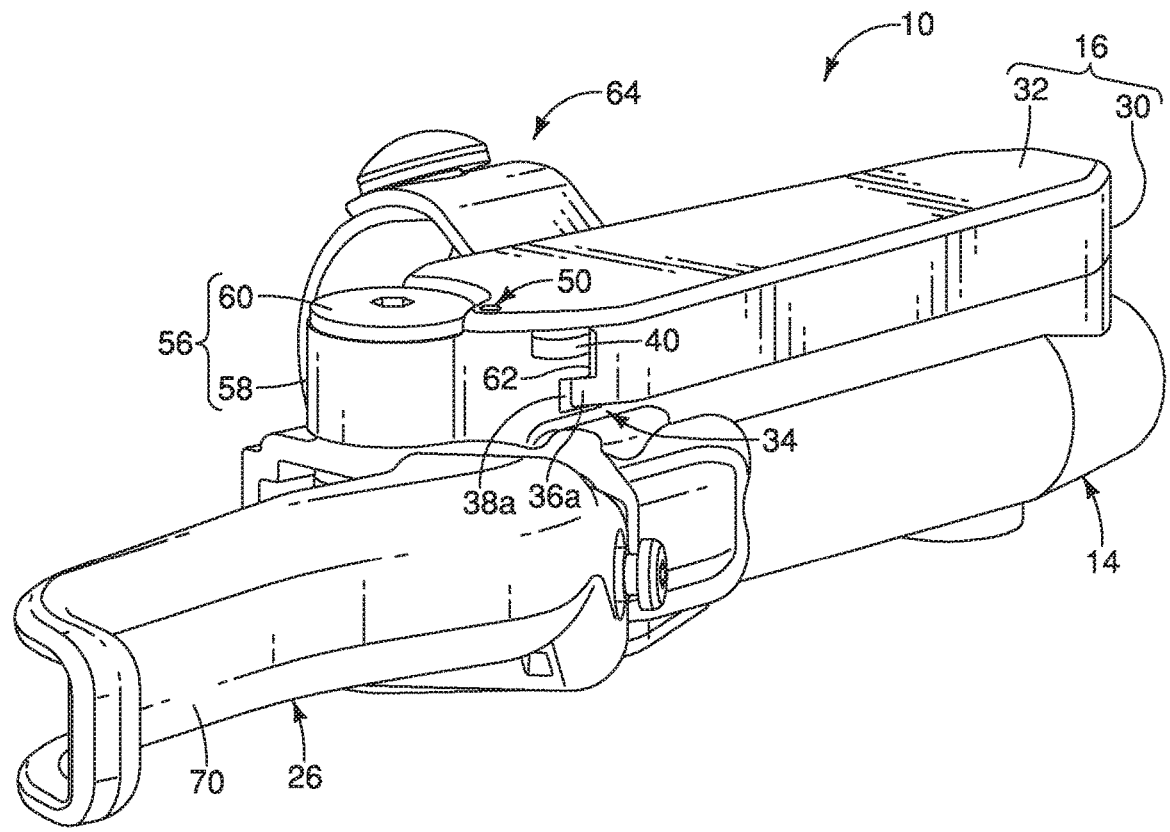
FIG. 9 is an exploded perspective view of selected part of the hydraulic device illustrated in FIGS. 1 to 8.

As seen in FIGS. 4, 7 and 9, the hydraulic device 10 further comprises a positioning member 50 that is configured to position the lid 32 to the reservoir tank 30. The positioning member 50 includes a pin 50a press-fitted to at least one of the lid 32 and the reservoir tank 30. The pin 50a is press-fitted to both the lid 32 and the reservoir tank 30. Namely, as seen in FIG. 4, the lid 32 has an opening 52 that is sized to receive the pin 50a therein. Likewise, the reservoir tank 30 has an opening 54 that is sized to receive the pin 50a therein. In this way, the lid 32 can not be removed while the pin 50a is disposed in both of the openings 52 and 54. While the pin 50a is press-fitted to both the lid 32 and the reservoir tank 30 in the illustrated embodiment, the openings 52 and 54 can be sized such that the pin 50a is only press-fitted to one of the openings 52 and 54 and is loosely disposed in the other one of the openings 52 and 54.

Figure 8:
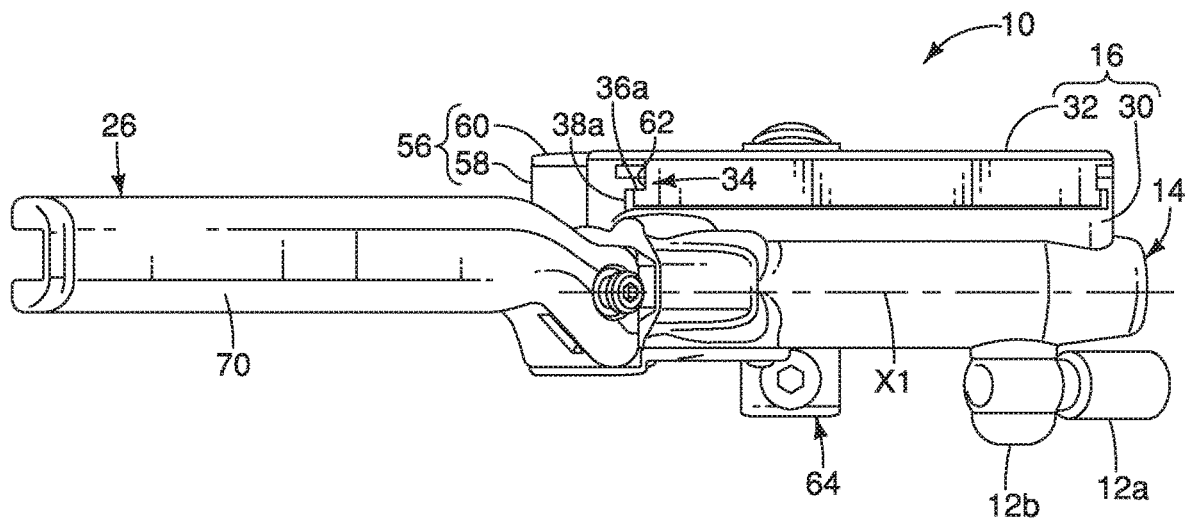
FIG. 8 is a front side elevational view of the hydraulic device illustrated in FIGS. 1 to 7.
Figure 10:
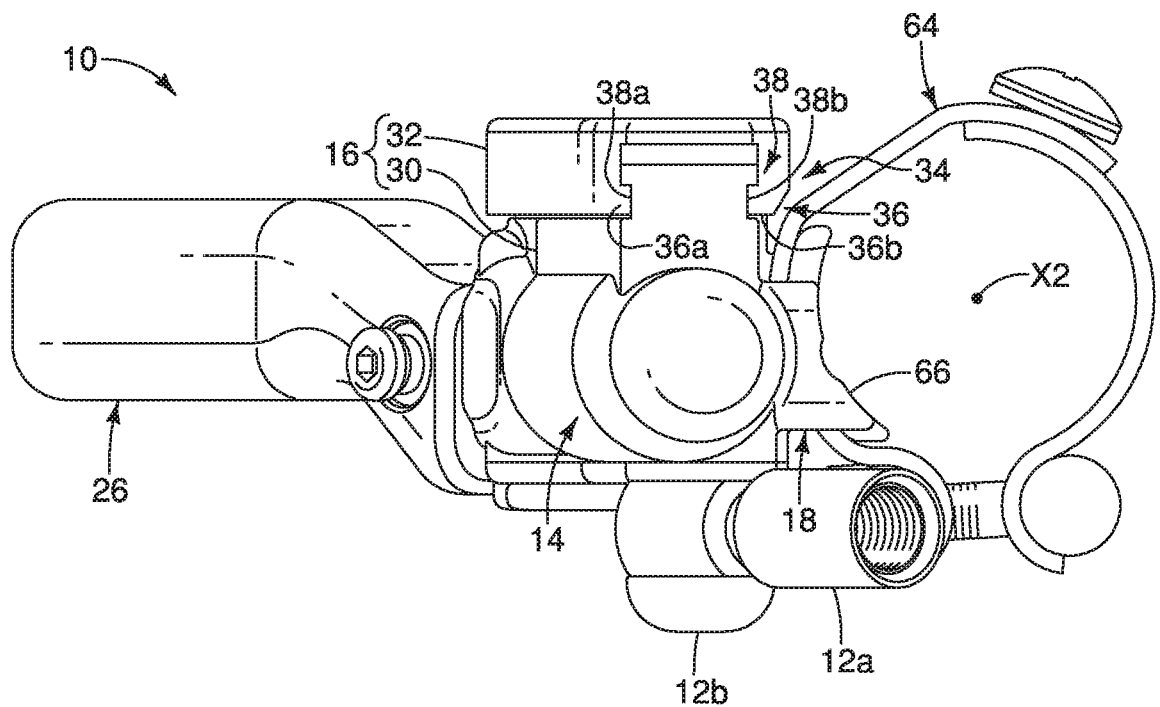
FIG. 10 is an inner end elevational view of the hydraulic device illustrated in FIGS. 1 to 9 as viewed parallel to a center handlebar mounting axis of the handlebar mounting structure.
Figure 11:
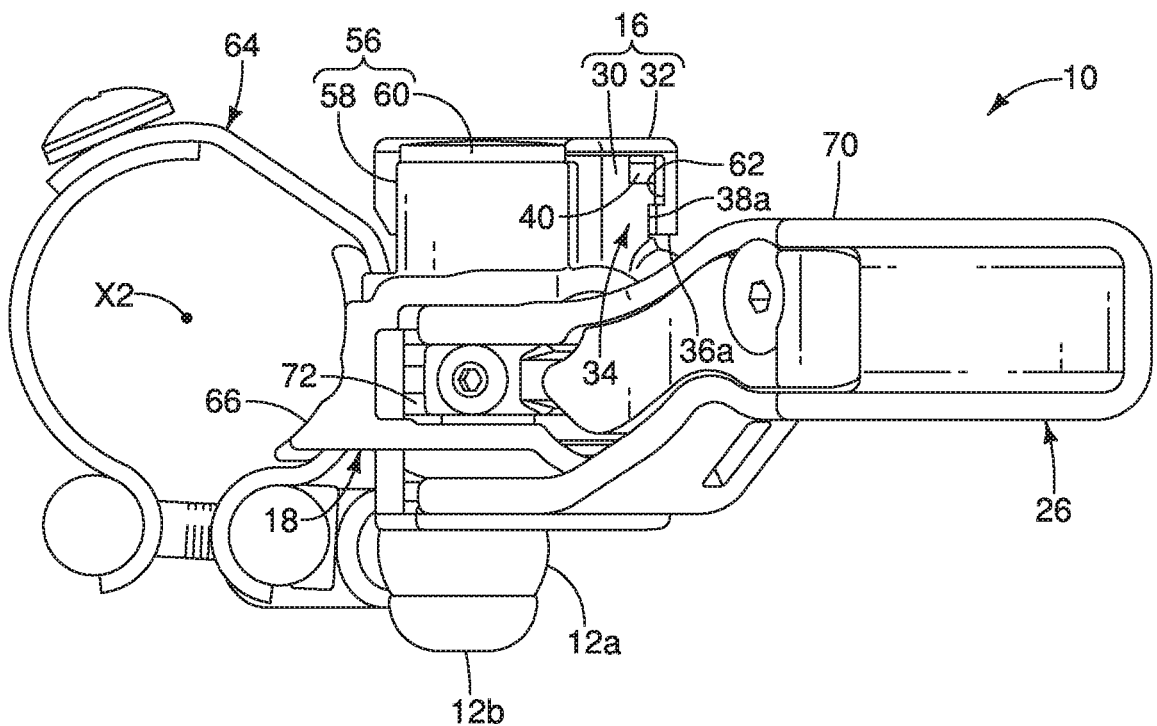
FIG. 11 is an outer end elevational view of the hydraulic device illustrated in FIGS. 1 to 10 as viewed parallel to a center handlebar mounting axis of the handlebar mounting structure.

The cylinder housing 14 has a bleeding part 56 that configured to be in fluid communication with the cylinder bore 20. Here, the bleeding part 56 includes a bleed port 58 and a screw plug 60. The bleed port 58 is integrally formed with the base 18 and has a threaded hole 58a for threadedly receiving the screw plug 60. As seen in FIG. 12, the bleed port 58 has a bleed passage 58b extending from the threaded hole 58a to the reservoir chamber 41. As seen in FIGS. 8 and 10, the reservoir 16 has substantially same height as the bleeding part 56 with respect to the cylinder housing 14 in a direction perpendicular to the axial direction A of the cylinder bore 20. In this way, the outer surfaces of the reservoir 16 and the bleeding part 56 are substantially flush each other.

As seen in FIGS. 7 and 9, the lid 32 has an opening 62 that is configured to at least partly expose the diaphragm 40 to atmosphere. The opening 62 faces in the axial direction A of the cylinder bore 20.

Referring back to FIG. 1, in the case of the hydraulic device 10 being mounted to the handlebar H, the hydraulic device 10 further comprises a handlebar mounting structure 64. Here, the handlebar mounting structure 64 is coupled to the base 18. The base 18 includes a handlebar contact portion 66. The handlebar contact portion 24 is configured to contact the handlebar H in a mounted state in which the base 18 is mounted to the handlebar H by the handlebar mounting structure 64. The handlebar mounting structure 64 and the handlebar contact portion 66 define a center handlebar mounting axis X2. It will be apparent from this disclosure that the handlebar mounting structure 64 is not limited to the illustrated embodiment, and that other types of handlebar mounting structures can be used.

Referring back to FIGS. 5 and 6, here, the operating member 26 includes a user operating lever 70 and a torque input member 72. The user operating lever 70 is pivotally coupled to the base 18 by a pivot pin 74 about a pivot axis P1 between a rest position (see FIGS. 2 and 5) and an operated position (see FIG. 6). The user operating lever 70 is a rigid member that is typically made of a metallic material or a hard resin material. The torque input member 72 is also pivotally coupled to the base 18 by a pivot pin 74 about the pivot axis P1. The torque input member 72 is a rigid member that is typically made of a metallic material or a hard resin material.

The piston 22 is operatively coupled to the operating member 26 to move the piston 22 within the cylinder bore 20 in response to operation of the operating member 26. A biasing element 76 is disposed in the cylinder bore 20, and biases the piston 22 to a non-actuated (rest or non-operated) position. Here, the biasing element 76 is a coil compression spring that biases the piston 22 to the non-actuated position. The biasing element 76 also biases the operating member 26 to its rest position (i.e., no external force applied to the operating member 26). Thus, the piston 22 compresses the biasing element 76 as the piston 22 moves in the cylinder bore 20 in response to an operation of the user operating lever 70 of the operating member 26.

Namely, as seen in FIG. 6, the piston 22 is coupled to the operating member 26 to be pushed in response to a pivotal movement of the operating member 26 from the rest position to the operated position. The piston 22 moves linearly along the cylinder axis X1 within the cylinder bore 20 in response to operation of the operating member 26. In this way, by a user operating the user operating lever 70, the torque transmission mechanism 28 pushes the piston 22 in the cylinder bore 20.

Here, as seen in FIGS. 5 and 6, the torque transmission mechanism 28 includes a torque transmission member 78, a connection rod 80 and a pair of cam guides 82 (only one shown). The torque transmission member 78 is pivotally coupled to the base 18 by a pivot pin 84 about a pivot axis P2. The torque transmission member 78 is a rigid member that is typically made of a metallic material or a hard resin material. As the torque input member 72 of the operating member 26 is pivoted by a user pivoting the user operating lever 70, the torque input member 72 pivots the torque transmission member 78, which in turn pushes the connection rod 80. As a result of the connection rod 80 being pushed by the torque transmission member 78, the piston 22 is pushed in the cylinder bore 20 by the connection rod 80. Thus, the connection rod 80 operatively connects the piston 22 to the torque transmission member 78.

Here, the connection rod 80 basically includes a shaft 80a, a yoke 80b, a roller 80c and a support pin 80d. The shaft 80a has one end operatively connected to the piston 22 and a second end fixed to the yoke 80b. The yoke 80b rotatably supports the roller 80c via the support pin 80d. The roller 80c is preferably rotatably supported on the support pin 80d by a bearing (not shown). The ends of the support pin 80d are located in the cam guides 82 for controlling the movement of the connection rod 80 with respect to the base 18.

Specifically, the cam guides 82 are mounted to the base 18 on opposite sides of the connection rod 80. Thus, the cam guides 82 support the ends of the support pin 80d of the connection rod 80 to the base 18. The cam guides 82 are shaped to control movement of the piston 22 in response to the movement of the user operating lever 70 of the operating member 26. Namely, each of the cam guides 82 has a profiled cam surface that controls the movement of the piston 22 with respect to the movement of the operating member 26. In this way, the piston 22 is moved in the cylinder bore 20 in response to a user operating the operating member 26.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., the bicycle) in an upright, riding position and equipped with the hydraulic device. Accordingly, these directional terms, as utilized to describe the hydraulic device should be interpreted relative to a human-powered vehicle (e.g., the bicycle) in an upright riding position on a horizontal surface and that is equipped with the hydraulic device. The terms "left" and "right" are used to indicate the "right" when referencing from the right side as viewed from the rear of the human-powered vehicle (e.g., the bicycle), and the "left" when referencing from the left side as viewed from the rear of the human-powered vehicle (e.g., the bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A hydraulic device comprising:
a cylinder housing including a cylinder bore; and
a reservoir configured to be in fluid communication with the cylinder bore, the reservoir including a reservoir tank and a lid slidably attached to the reservoir tank, the lid slidably covering an exterior opening of the reservoir tank that opens to an exterior of the hydraulic device, the exterior opening facing the exterior of the hydraulic device in an opening direction, the lid being slidable along the reservoir tank in a sliding direction that is perpendicular to the opening direction.

2. The hydraulic device according to claim 1, wherein the reservoir tank and the lid define a guiding structure to slidably guide the lid with respect to the reservoir tank.

3. A hydraulic device comprising:
a cylinder housing including a cylinder bore; and
a reservoir configured to be in fluid communication with the cylinder bore, the reservoir including a reservoir tank and a lid slidably attached to the reservoir tank, the reservoir tank and the lid defining a guiding structure to slidably guide the lid with respect to the reservoir tank, the guiding structure including
a guiding protrusion provided to one of the reservoir tank and the lid, and
a guiding recess provided to the other of the reservoir tank and the lid to engage with the guiding protrusion.

4. The hydraulic device according to claim 3, wherein
the guiding protrusion is provided to the lid,
the guiding protrusion includes a first guiding protrusion, and a second guiding protrusion facing toward the first guiding protrusion,
the guiding recess is provided to the reservoir tank, and
the guiding recess includes a first guiding recess configured to engage the first guiding protrusion, and a second guiding recess configured to engage the second guiding protrusion.

5. The hydraulic device according to claim 1, wherein
the cylinder bore defines a cylinder axis extending in an axial direction of the cylinder bore, and
the lid is slidable in a sliding direction non-perpendicular to the axial direction.

6. The hydraulic device according to claim 1, further comprising
a positioning member configured to position the lid to the reservoir tank.

7. The hydraulic device according to claim 6, wherein
the positioning member includes a pin press-fitted to at least one of the lid and the reservoir tank.

8. The hydraulic device according to claim 7, wherein
the pin is press-fitted to both the lid and the reservoir tank.

9. The hydraulic device according to claim 1, wherein
the reservoir is provided to the cylinder housing.

10. A hydraulic device comprising
a cylinder housing including a cylinder bore; and
a reservoir configured to be in fluid communication with the cylinder bore, the reservoir including a reservoir tank and a lid slidably attached to the reservoir tank, the reservoir being provided to the cylinder housing,
the cylinder housing having a bleeding part configured to be in fluid communication with the cylinder bore, and
the reservoir having a same height as the bleeding part with respect to the cylinder housing in a direction perpendicular to an axial direction of the cylinder bore.

11. The hydraulic device according to claim 1, wherein
the reservoir includes a diaphragm arranged to define a reservoir chamber between the reservoir tank and the diaphragm.

12. The hydraulic device according to claim 11, wherein
the lid has an opening configured to at least partly expose the diaphragm to atmosphere.

13. The hydraulic device according to claim 12, wherein
the cylinder bore defines a cylinder axis extending in an axial direction of the cylinder bore, and
the opening faces in the axial direction of the cylinder bore.

14. A hydraulic device comprising
a cylinder housing including a cylinder bore; and
a reservoir configured to be in fluid communication with the cylinder bore, the reservoir including a reservoir tank and a lid slidably attached to the reservoir tank, the reservoir further including a diaphragm arranged to define a reservoir chamber between the reservoir tank and the diaphragm, the reservoir further including an intermediate member arranged between the lid and the diaphragm.

15. The hydraulic device according to claim 14, wherein
the diaphragm and the intermediate member define a positioning structure to position the diaphragm and the intermediate member relative to one another.

16. The hydraulic device according to claim 15, wherein
the positioning structure includes
a positioning protrusion provided to one of the diaphragm and the intermediate member, and
a positioning recess provided to the other of the diaphragm and the intermediate member to engage with the positioning protrusion.

17. The hydraulic device according to claim 16, wherein
the positioning protrusion is circumferentially provided along an outer edge of the one of the diaphragm and the intermediate member, and
the positioning recess is circumferentially provided along an outer edge of the other of diaphragm and the intermediate member.

18. The hydraulic device according to claim 14, wherein
the intermediate member is made of a resin material.

19. The hydraulic device according to claim 1, further comprising
a piston arranged in the cylinder bore to define a cylinder chamber between the cylinder bore and the piston.

20. The hydraulic device according to claim 19, further comprising
an operating member operatively coupled to the piston.

* * * * *